United States Patent Office 3,637,732
Patented Jan. 25, 1972

3,637,732

SATURATED HYDROCARBON SUBSTITUTED IMIDAZOLYL PHOSPHORUS COMPOUNDS

Paul B. Budde and Henry Tolkmith, Midland, Mich., assignors to The Dow Chemical Company, Midland, Mich.

No Drawing. Original application Feb. 1, 1966, Ser. No. 523,852, now Patent No. 3,466,369, dated Sept. 9, 1969. Divided and this application Apr. 24, 1969, Ser. No. 835,846

Int. Cl. C07d *49/36*

U.S. Cl. 260—309 4 Claims

ABSTRACT OF THE DISCLOSURE

Imidazoyl phosphorothioates wherein the phosphorus atom additionally bears (a) an alkyl or cyclohexyl group and (b) a heteroparaffinic amido, imidazole, or di-substituted amino group in which one substituent is methyl or ethyl and the other substituent is lower alkyl, phenylloweralkyl, furfuryl, tetrahydrofurfuryl, or 4-pyridylmethyl, the imidazole radicals being optionally substituted with one member selected from lower alkyl and phenyl. These compounds are useful as fungicides.

This application is a divisional application of Ser. No. 523,852, filed Feb. 1, 1966, now U.S. Pat. 3,466,369.

The present invention is concerned with saturated hydrocarbon imidazoyl phosphorus compounds of the formula

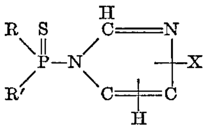

and with methods employing and compositions comprising the compounds for the control of fungal organisms. In the above and succeeding formulae in the present specification and claims, R represents a member selected from the group consisting of alkyl and cyclohexyl; R′ represents a member selected from the group consisting of heteroparaffinic amido, a radical of the formula

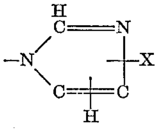

and a radical of the formula

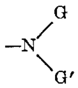

G being a member selected from the group consisting of methyl and ethyl, and G′ being a member selected from the group consisting of loweralkyl, phenylloweralkyl, furfuryl, tetrahydrofurfuryl, and (4-pyridylmethyl); and each X independently represents a member selected from the group consisting of hydrogen, loweralkyl, and phenyl.

In the present specification and claims, the terms "imidazolyl phosphorus compound" and "imidazolyl phosphorus compounds" are employed to designate only a compound or compounds of this formula, hereinabove. The unmodified term "imidazolyl" is employed to refer only to a moiety of the formula

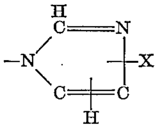

Also, in the present specification and claims, the term "alkyl" is employed to designate an alkyl radical being of from 1 to 10, both inclusive, carbon atoms, and the term "loweralkyl," to designate an alkyl radical being of from 1 to 4, both inclusive, carbon atoms. The term "heteroparaffinic amido" is employed in the present specification and claims to describe a radical selected from the group consisting of morpholino, thiomorpholino, piperidino, 1-pyrrolidinyl, 4-substituted-1-piperazinyl wherein the substituent is loweralkyl, phenyl, or acetyl, and 1,2,3,6-tetrahydro-1-pyridyl.

The novel products of the present invention are liquids or crystalline solid materials which are somewhat soluble in many common organic solvents and of very low solubility in water. They exhibit the advantageous and highly desirable combination of high fungitoxicity and low mammalian toxicity and are therefore very useful in the control of fungal organisms.

The products of the present invention are prepared by reacting a phosphorus chloride starting material of the formula

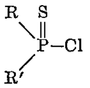

with an imidazole compound of the formula

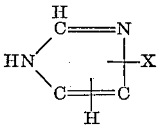

The reaction is conveniently carried out in the presence of an organic liquid as an inert liquid reaction medium, and in the presence of a hydrogen chloride acceptor. The imidazole compound can be employed both as reactant and as hydrogen chloride acceptor, or any tertiary organic amine, such as triethylamine, can be employed as hydrogen chloride acceptor. The reaction takes place smoothly at temperatures between 0° and 60° C., and preferably at temperatures between 25° and 60°, with the production of the desired imidazolyl phosphorus compound and by-product which appears as the hydrochloride salt of the compound employed as hydrogen chloride acceptor.

Organic liquids which are suitable as reaction media include hydrocarbons, such as benzene, toluene, xylene, and cyclohexane; ethers, such as diethyl ether, 1,2-dimethoxyethane, or tetrahydrofuran; and tertiary amines, such as trialkylamines. It is generally preferred to avoid the use as reaction medium of any compound which has a reactive hydrogen, because its use may result in side reactions.

The amounts of the reactants to be employed are not critical, some of the desired product compound being obtained when employing the reactants in any amounts. However, the reaction consumes the reactants in amounts representing equimolecular proportions of phosphorus chloride starting material, imidazole compound, and hydrogen chloride acceptor, and the use of amounts which represent such proportions is preferred. When imidazole compound is employed both as reactant and as hydrogen chloride acceptor, the reaction consumes one molecular proportion of phosphorus chloride starting material and two molecular proportions of imidazole compound, and the use of the reactants in amounts representing such proportions is preferred.

In carrying out the reaction, the reactants are contacted together in any convenient fashion and maintained for a period of time in the reaction temperature range. Some of the desired product is formed immediately upon the contacting together of the reactants; however, the yield of the desired product is increased by permitting the reaction mixture to stand for a period of time, preferably with stirring or other mechanical agitation of the mixture. Following the completion of the reaction, the reaction mixture can be employed for the useful purposes of the present invention. However, the desired product compound can be separated from the reaction mixture. In many instances, for example, where the product compound is to be employed for the control of fungal organisms attacking foliage and a phytotoxic compound has been employed as reaction medium, separation is preferable. The separation is carried out in conventional procedures. Most typically, the reaction mixture is filtered to separate the insoluble hydrochloride by-product salt, and organic liquid employed as reaction mixture is removed from the filtrate by evaporation under subatmospheric pressure to separate the desired product. The product so obtained can be used without purification or can be purified by conventional procedures. For example, the separated product can be mixed with a quantity of any of the organic liquids to be employed as reaction medium, the resulting mixture filtered to separate insoluble by-product materials, and the organic liquid removed from the filtered mixture by evaporation under subatmospheric pressure, to obtain the purified product. Also, in the instance of those products which are solids, the separated product can be purified by recrystallization.

The imidazolyl phosphorus compounds can also be prepared in an alternate procedure. In this procedure, a phosphonothioic dichloride compound having the formula

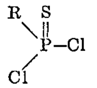

is reacted, in the presence of a hydrogen chloride acceptor, with an imidazole compound, as previously defined, to form an intermediate imidazolyl phosphorus chloride compound of the corresponding formula

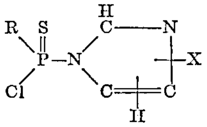

This intermediate is thereafter reacted, in the presence of a hydrogen chloride acceptor, with an amino compound of the formula R'H to obtain the desired imidazolyl phosphorus compound.

The reactions of this alternate procedure are conveniently carried out in a reaction medium of the sort employed in the preparation procedure previously described. The hydrogen chloride acceptor employed in either reaction of the procedure can be an organic tertiary amine; preferably, however, the imidazole compound, or amino compound, respectively, is employed both as reactant and as hydrogen chloride acceptor. Good results are obtained when employing, in the first of the reactions, substantially equimolecular proportions of phosphonothioic dichloride compound, imidazole compound, and hydrogen chloride acceptor, and when employing, in the second of the reactions, substantially equimolecular proportions of intermediate, amino compound, and hydrogen chloride acceptor. When imidazole compound and amino compound are employed both as reactant and as hydrogen chloride acceptor, good results are obtained when employing, in the first of the reactions, one molecular proportion of phosphonothioic dichloride compound and two molecular proportions of imidazole compound and when employing, in the second of the reactions, one molecular proportion of intermediate and two molecular proportions of amino compound. The first reaction is somewhat exothermic and is carried out at temperatures of from −50° to 25° C. The second reaction is also exothermic and takes place at temperatures of from −10° to 60° C. The temperature can be controlled by regulating the rate of mixing and contacting of the reactants, and by external cooling. The by-product in both steps is a hydrochloride salt, appearing as the hydrochloride salt of the hydrogen chloride acceptor. Following the reaction, the desired product can be separated in accordance with the conventional procedures described for the first preparation procedure above.

In a second alternative procedure applicable to those products wherein R' represents a group identical with the imidazolyl moiety in the general formula, a phosphonothioic dichloride compound, as previously defined, is reacted, in the presence of a hydrogen chloride acceptor, with an imidazole compound, as previously defined, to obtain product of the formula

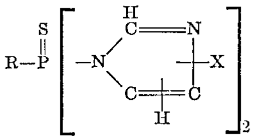

The hydrogen chloride acceptor can be any tertiary organic amine, or the imidazole compound can be employed both as reactant and as hydrogen chloride acceptor, in which instance it is preferred to employ the materials in amounts representing one molecular proportion of phosphonothioic dichloride and four molecular proportions of imidazole compound. The reaction takes place readily at temperatures of from 0° to 60° C. with the production of the desired product and hydrochloride salt of reaction, which salt ordinarily appears as the hydrochloride salt of the hydrogen chloride acceptor. Upon completion of the reaction, the desired product is separated by the conventional procedures previously described.

In all preparation procedures hereinabove discussed, the imidazolyl moiety is introduced by reaction of a phosphorus-containing compound, as variously defined, with an imidazole compound, as defined. The imidazole compound ordinarily occurs as a tautomeric form in which no hydrogen is fixably positioned at any given ring-nitrogen atom. Accordingly, in the reaction of certain of these reactants, in the methods hereinabove presented, isomeric mixtures of products are produced. These mixtures share the advantages exhibited by the products of the present invention generally and can be employed directly in the fungicidal methods of the present invention.

The following examples illustrate the best methods now known for the practice of the present invention and will enable those skilled in the art to practice the invention.

EXAMPLE 1.—N,N,P-TRIMETHYL-P-IMIDAZOL-1-YLPHOSPHINOTHIOIC AMIDE

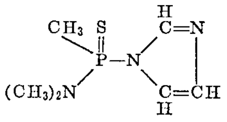

N,N,P - trimethylphosphonamidothioic chloride (21.5 grams; 0.135 mole) was mixed with 250 milliliters of benzene. To the resulting mixture, 18.5 grams of imidazole (0.27 mole) were added portionwise to the mixture over a two hour period. The addition was carried out with the reaction mixture at room temperature of about 22–23° C. After the completion of the addition, the reaction mixture was stirred for fourteen hours, also at room temperature. Thereafter, the reaction mixture was filtered to separate by-product imidazole hydrochloride, and the imidazole hydrochloride washed with two 100-milliliter portions of benzene. The wash liquid and the filtrate were combined and concentrated to obtain 25.0 grams of the desired N,N,P - trimethyl - P-imidazol-1-ylphosphinothioic amide product as a liquid residue. The product residue was mixed with 100 milliliters of carbon tetrachloride, insoluble materials removed, and the mixture concentrated; this procedure was then duplicated employing one liter of cyclohexane. The yield was 86.4 percent. The purified product has a refractive index $n_D^{25}$ of 1.5809.

EXAMPLE 2.—N,N-DIMETHYL-P-CYCLOHEXYL-P-IMIDAZOL-1-YLPHOSPHINOTHIOIC AMIDE

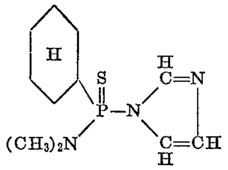

Cyclohexylphosphonothioic dichloride (21.7 grams; 0.1 mole) is mixed with 100 milliliters of benzene and the resulting mixture cooled to temperatures of about 0–5° C. Thereafter, 13.6 grams of imidazole (0.2 mole) are added to the cooled mixture. The addition is carried out portionwise over a period of time so that the temperature of the reaction mixture does not rise above 10° C. Upon completion of the stirring the reaction mixture is held at temperatures of 5–10° C. for a period of time. As a result of these operation, the desired cyclohexylimidazol-1-ylphosphinothioic chloride is prepared in the reaction mixture. The reaction mixture is then filtered to separate imidazole hydrochloride.

Thereafter, 18.0 grams of dimethylamine (0.4 mole) are added to the filtrate. The addition is carried out portionwise over a period of time such that the temperature of the resulting reaction mixture is always below 10° C. As a result of these operations, the desired N,N-dimethyl-P-cyclohexyl-P-imidazol-1-ylphosphinothioic amide product is prepared in the reaction mixture. Dimethylamine hydrochloride by-product and the benzene are removed in conventional procedures to separate the product. It has a molecular weight of 257.3.

Other representative products of the present invention include the following:

N,N-dimethyl-P-tert-butyl-P-imidazol-1-ylphosphinothioic amide, having a molecular weight of 231.3;
N,N-dimethyl-P-isopropyl-P-(4(and 5)-ethylimidazol-1 yl)phosphinothioic amide, having a molecular weight of 245.3;
N,N-dimethyl-P-n-butyl-P-imidazol-1-ylphosphinothioic amide, having a molecular weight of 231.3;
N,N-diethyl-P-n-propyl-P-(4(and 5)-phenylimidazol-1-yl)phosphinothioic amide, having a molecular weight of 321.4;
N,N-dimethyl-P-sec-butyl-P-imidazol-1-ylphosphinothioic amide, having a molecular weight of 231.3;
N,N-dimethyl-P-isobutyl-P-imidazol-1-ylphosphinothioic amide, having a molecular weight of 231.3;
N,N,P-trimethyl-P-(4(and 5)-methylimidazol-1-yl) phosphinothioic amide, having a molecular weight of 203.3;
N,N-diethyl-P-methyl-P-imidazol-1-ylphosphinothioic amide, having a molecular weight of 217.3;
P-n-hexyl-P-morpholino-P-(4(and 5)-n-butyl-imidazol-1-ylphosphine sulfide, having a molecular weight of 358;
N,P-dimethyl-N-tetrahydrofurfuryl-P-imidazol-1-ylphosphinothioic amide, having a molecular weight of 217.3;
N-benzyl-N-methyl-P-ethyl-P-imidazol-1-ylphosphinothioic amide, having a molecular weight of 279.4;
P-methyl-P-1-pyrrolidinyl-P-imidazol-1-ylphosphine sulfide, having a molecular weight of 215.3;
P-n-decyl-P-piperidino-P-imidazol-1-ylphosphine sulfide, having a molecular weight of 356;
P-methyl-P-(4-phenyl-1-piperazinyl)-P-imidazol-1-ylphosphine sulfide, having a molecular weight of 306.4;
N,P-dimethyl-N-(4-phenylbutyl)-P-imidazol-1-ylphosphinothioic amide, having a molecular weight of 307.4;
N,P-dimethyl-N-phenethyl-P-imidazol-1-ylphosphinothioic amide, having a molecular weight of 279.4;
P-methyl-P-thiomorpholino-P-(4(and 5)-methylimidazol-1-yl)phosphine sulfide, having a molecular weight of 261.4;
P-ethyl-P-(4-methyl-1-piperazinyl)-P-imidazol-1-ylphosphine sulfide, having a molecular weight of 258.3;
N-methyl-N-(4-pyridylmethyl)-P-ethyl-P-imidazol-1-ylphosphinothioic amide, having a molecular weight of 280.3;
N-ethyl-N-furfuryl-P-methyl-P-imidazol-1-ylphosphinothioic amide, having a molecular weight of 269.3;
P-n-butyl-P-(4-n-butyl-1-piperazinyl)-P-imidazol-1-ylphosphine sulfide, having a molecular weight of 328.5;
N,N-dimethyl-P-isooctyl-P-imidazol-1-ylphosphinothioic amide, having a molecular weight of 287.4;
P-methyl-P-(4-acetyl-1-piperazinyl)-P-imidazol-1-ylphosphine sulfide, having a molecular weight of 272.3;
N-n-butyl-N,P-dimethyl-P-imidazol-1-ylphosphinothioic amide, having a molecular weight of 231.3; and
P-methyl-P-(1,2,3,6-tetrahydro-1-pyridyl)-P-imidazol-1-ylphosphine sulfide, having a molecular weight of 227.3.

It has been discovered that the present imidazolyl phosphorus compounds are particularly adapted to be employed for the control of a wide range of fungi, especially those fungal organisms ordinarily found on the aerial portions of plants, such as, for example, cherry leaf spot, apple scab, rice blast, powdery mildew, Helminthosporium (leaf spot on grasses, cereals, and corn), and late blight. The compounds can also be applied in dormant applications to the woody surfaces of plants or to orchard floor surfaces for the control of the over-wintering spores of many fungi. In addition, the imidazolyl phosphorus compounds can be applied to seeds to protect the seeds from the attack of fungal organisms such as rot and mildew. Also, the imidazolyl phosphorus compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric materials, or in oil or latex paints, to prevent mold, mildew, and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew, and decay. The foregoing environments are merely illustrative of the many habitats in which these agents can be distributed to obtain excellent fungal control.

It is an advantage of the present invention that compositions containing these compounds can be applied to growing vegetation in amounts required for effective control without significant injury to the plants. It is a further advantage that the compounds of the present invention are of very low toxicity to mammals. It is another advantage that a single application of the compounds will provide a residual and extended control of fungi over a considerable period of time. Also, it is an advantage that the imidazolyl phosphorus compounds are effective in eliminating established fungal infestation as well as in providing residual and extended control against fungal attack. Further, the compounds have been found to be translocated in plants and thus it is an advantage of the present invention that the compounds provide a systemic protection against the plant attacking organisms. It is a yet further advantage that the compounds can be handled with a minimum of danger from accidental mammalian exposure thereto because of their low mammalian toxicity.

The method of the present invention comprises contacting a fungal organism with a fungicidal amount of one or more of the imidazolyl phosphorus compounds. However, the present invention also embraces the employment of a liquid, powder or dust composition containing one or more of the compounds. Such compositions are adapted to be applied to the living plants without substantial injury to the plants. In preparing toxicant compositions, the imidazolyl phosphorus compounds can be modified with one or more of a plurality of additaments including organic solvents, petroleum distillates, water or other liquid carriers, surface active dispersing agents, and finely divided inert solids. In such compositions, the compounds oftentimes are present in a concentration from about 2 to 98 percent by weight. Depending upon the concentration in the composition of one or more of the imidazolyl phosphorus compounds, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

The exact concentration of the imidazolyl phosphorus compound employed in the compositions for application to the fungal organism and/or its habitat can vary provided a fungicidal dosage of toxicant is applied either on the organism or its environment. This dosage of toxicant is primarily dependent upon the susceptibility of the particular organism to the particular imidazolyl phosphorus compound employed. In general, good results are obtained with liquid compositions containing from about 0.0001 to 2.0 percent by weight of toxicant; in some operations, however, compositions containing as much as from 2 to 98 percent by weight are conveniently employed, as for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the toxicant is applied to plots of growing plants at a dosage of from 0.004 to 3 or more pounds per acre.

In the protection and preservation of inks, adhesives, cutting oils, paints, textiles, and paper, good results are obtained when the compounds are incorporated in such products in the amount of at least 0.0001 percent by weight. In the preservation of wood, excellent results are obtained when the compounds are incorporated by conventional treatment in the wood in the amount of at least 0.0001 pound per cubic foot of wood.

In the preparation of dust compositions, the toxicant products can be compounded with any of the finely divided solids such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents, such as fuller's earth, bentonite, attapulgite and other clays. Depending upon the proportions of ingredients these dust compositions can be employed for the control of fungi or employed as concentrates and subsequently diluted with an additional solid surface-active dispersing agent or with pyrophyllite, chalk, talc, gypsum, and the like to obtain the desired amount of active ingredient in a composition adapted to be employed for the control of fungi. Also, such dust compositions, when employed as concentrates, can be dispersed in water, with or without the aid of dispersing agents, to form spray mixtures.

Further, the imidazolyl phosphorus compounds or a liquid or dust concentrate composition containing such compounds can be incorporated in intimate mixture with surface-active dispersing agents such as non-ionic emulsifying agents to form spray compositions. Such compositions are readily employed for the control of fungi or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers such as the condensation products of alkylene oxides with the inorganic acids, polyoxyethylene derivatives of sorbitan esters, complex ether alcohols and the like. Suitable organic liquids which can be employed in the composition include petroleum oils and distillates, toluene, and synthetic organic oils. The surface-active dispersing agents are usually employed in liquid compositions in the amount of from 0.1 to 20 percent by weight of the combined weight of the dispersing agent and active compound.

When operating in accordance with the present invention, the imidazolyl phosphorus compounds or a composition containing the compounds can be applied to the fungal organisms to be controlled, or to their habitats in any convenient fashion, e.g., by means of hand dusters or sprayers. Applications to the above-ground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be applied from airplanes.

In other operations, the imidazolyl phosphorus compounds can be dispersed in an atmosphere, particularly within a space temporarily or permanently enclosed such as a greenhouse, railroad car, or the like, to control fungal organisms therewithin, to protect contents exposed to the atmosphere, and to control air-borne fungal organisms such as spores and the like. In these operations, an imidazolyl phosphorus compound can be placed upon a surface of which the temperature facilitates volatilization, at a desired rate, of the compound or composition containing the same into the atmosphere; also, in an alternate embodiment, an imidazolyl phosphorus compound can be used as an aerosol, that is, incorporated with a propellant and, if desired, a cosolvent, and the resulting composition released from a pressure container into the atmosphere.

The following examples further illustrate the present invention.

EXAMPLE 3

50 parts by weight of N,N,P-trimethyl-P-imidazol-1-ylphosphinothioic amide is mixed and ground with 18 parts of diatomaceous earth (Celite 209), 24 parts of a hydrous aluminum silicate (Barden Clay), 6 parts of an alkyl aryl sulfonate (Nacconol NRSF), and 2 parts of a substituted benzoic alkyl sulfonic acid (Daxad No. 27) to prepare a composition which can be used in accordance with the foregoing teachings. In a similar manner, other compositions are prepared by employing one of the following in place of the N,N,P-trimethyl-P-imidazol-1-ylphosphinothioic amide:

N,N-dimethyl-P-tert-butyl-P-imidazol-1-ylphosphinothioic amide
N,N-dimethyl-P-isopropyl-P-(4(and 5)-ethylimidazol-1-yl)phosphinothioic amide;
N,N-dimethyl-P-n-butyl-P-imidazol-1-ylphosphinothioic amide;
P-n-hexyl-P-morpholino-P-(4(and 5)-n-butylimidazol-1-yl)phosphine sulfide;

N,P-dimethyl-N-tetrahydrofurfuryl-P-imidazol-1-ylphosphoinothioic amide;

N-benzyl-N-methyl-P-ethyl-P-imidazol-1-ylphosphinothioic amide;

P-methyl-P-1-pyrrolidinyl-P-imidazol-1-ylphosphine sulfide;

P-n-decyl-P-piperidino-P-imidazol-1-ylphosphine sulfide;

P-methyl-P-(4-phenyl-1-piperazinyl)-P-imidazol-1-ylphosphine sulfide;

N,P-dimethyl-N-(4-phenylbutyl)-P-imidazol-1-ylphosphinothioic amide; and

N,N-dimethyl-P-sec-butyl-P-imidazol-1-ylphosphinothioic amide.

Also, 90 parts by weight of N,N,P-trimethyl-P-imidiazol-1-ylphosphinothioic amide and 10 parts by weight of a sorbitan monolaurate polyoxyethylene derivative (Tween 20) are mixed together to prepare another composition which also can be employed according to the foregoing teachings. In a similar manner, other compositions are prepared by employing one of the following in place of N,N,P-trimethyl-P-imidazol-1-ylphosphinothioic amide:

N,N-dimethyl-P-isobutyl-P-imidazol-1-ylphosphinothioic amide;

N,N,P-trimethyl-P-(4(and 5)-methylimidazol-1-yl)phosphinothioic amide;

N,P-dimethyl-N-phenethyl-P-imidazol-1-ylphosphinothioic amide;

P-methyl-P-thiomorpholino-P-(4(and 5)-methylimidazol-1-yl)phosphine sulfide;

P-ethyl-P-(4-methyl-1-piperazinyl)-P-imidazol-1-ylphosphine sulfide;

N-methyl-N-(4-pyridylmethyl)-P-ethyl-P-imidazol-1-ylphosphinothioic amide;

N-ethyl-N-furfuryl-P-methyl-P-imidazol-1-ylphosphinothioic amide;

P-n-butyl-P-(4-n-butyl-1-piperazinyl)-P-imidazol-1-ylphosphine sulfide;

N,N-dimethyl-P-isooctyl-P-imidazol-1-pylphosphinothioic amide;

P-methyl-P-(4-acetyl-1-piperazinyl)-P-imidazol-1-ylphosphine sulfide;

N-n-butyl-N,P,-dimethyl-P-imidazol-1-ylphosphinothioic amide;

P-methyl-P-(1,2,3,6-tetrahydro-1-pyridyl)-P-imidazol-1-ylphosphine sulfide;

N,N-diethyl-P-methyl-P-imidazol-1-ylphosphinothioic amide;

N,N-diethyl-P-n-propyl-P-(4(and 5)-phenylimidazol-1-yl)phosphinothioic amide; and N,N-dimethyl-P-cyclohexyl-P-imidazol-1-ylphosphinothioic amide.

In other procedures, aqueous compositions are prepared by mixing and grinding together in a ballmill 0.06 part by weight of one of the imidazolyl phosphorus compounds, 0.06 part of an alkyl aryl sulfonate (Nacconol NR), 0.06 part of Daxad No. 27, and 200 parts of water.

These compositions are adapted to be employed for the control of fungi or to be dispersed in water to provide aqueous compositions having desirable wetting properties. The compositions are useful for the distribution of the compounds in fungicidal amounts.

EXAMPLE 4

Four parts by weight of N,N,P-trimethyl-P-imidazol-1-ylphosphinothioic amide, 0.08 part of sorbitan trioleate (Span 85) and 0.02 part of a sorbitan monolaurate polyoxyethylene derivative (Tween 80) were dispersed in 40 milliliters of acetone to produce a concentrate composition in the form of a water-dispersible liquid. A portion of this concentrate composition was dispersed in water to produce an aqueous spray composition containing 150 parts of the subject compound per million parts by weight of ultimate mixture. This composition was sprayed with an atomizing spray nozzle using air pressure at 20 pounds per square inch on young potato plants which were about 6 inches tall. The applications were carried out so as to give thorough coverage of all surfaces of the leaves of the plants without appreciable run-off. Following the applications, the spray compositions were allowed to dry upon the leaf surfaces and the plants then inoculated by spraying with a suspension of viable spores of *Phytophthera infestans* (late blight). Untreated potato plants of the same maturity were similarly inoculated to serve as checks. Immediately following the inoculation, all plants were placed in a moist chamber and maintained at 70° F. under saturated humidity conditions for 24 hours. Thereafter, the plants were set aside under greenhouse conditions for about five days and observed for the development of the lesions of late blight caused by the Phytophthera organisms to determine the percent control of this organism.

Observation about one week following the inoculations showed a complete control of *Phytophthora infestans* on the plants sprayed with the composition containing N,N,P-trimethyl-P-imidazol-1-imidazol - 1 - ylphosphinothioic amide. At the time of the observations, the leaves of the untreated check plants were found to be heavily covered with lesions of *Phytophthora infestans.*

EXAMPLE 5

Results essentially the same as those reported in Example 4 are obtained when the procedures of Example 4 are duplicated employing separately each of several different imidazolylphosphinothioic amide compounds in place of the one employed in Example 4. These other compounds are as follows:

N,N-dimethyl-p-cyclohexyl-p-imidazol-1-ylphosphinothioic amide,

N,N-dimethyl-p-tert-butyl-p-imidazol-1-ylphosphinothioic amide, and

N,N-diethyl-p-methyl-p-imidazol-1-ylphosphinothioic amide.

EXAMPLE 6

N,N,P - trimethyl-p-imidazol - 1 - ylphosphinothioic amide was employed for the control of mildew (*Erysiphe polygoni*) on pinto beans (*Phaseolus vulgaris*). In these operations, stands of beans, of a height of 2–4 inches, were sprayed with an aqueous composition prepared in accordance with the procedures of Example 4 and containing 4,000 parts of the subject compound per million parts by weight of ultimate composition. The stands were then inoculated by exposure to nearby infected stands. At the same time, other untreated stands were similarly inoculated to serve as a control.

At the end of two weeks, the stands were examined to determine what control had been obtained. In the stands, a complete control of mildew was observed, whereas the control stands exhibited heavy infestations of mildew.

The phosphonothioic dichloride starting materials employed in the synthesis of the products of the present invention are prepared in accordance with the procedure set forth in "Methoden Der Organischen Chemie," volume XII, part 1, page 400 and page 552.

The phosphorus chloride starting materials employed in the synthesis of the products of the present invention are prepared by reacting the corresponding phosphonothioic dichloride starting materials

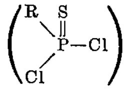

with an amino compound as previously defined (R'H).

The reaction is conveniently carried out in an inert liquid reaction medium, at temperatures of from −10° to 50° C., and in the presence of a hydrogen chloride acceptor, which is preferably an additional amount of the amino compound reactant. The reaction consumes the hydrogen chloride acceptor and each of the reactants in equimolecular amounts, but in the preferred embodiment, the reactants are employed in amounts representing one molecular proportion of phosphonothioic dichloride and two molecular proportions of amino compound. Separation of the products is carried out in conventional procedures.

The present application is directed to and concerned with the disclosure and claiming of the invention as described hereinbefore. The present application is also directed to the disclosure and claiming of the invention in compounds, methods, or compositions, comprising or employing any subgeneric group or class of imidazolyl phosphorus compounds which may be obtained by any permutation or combination of the alternative expressions in the several compound definitions to be found hereinbefore.

We claim:

1. Compound of the formula

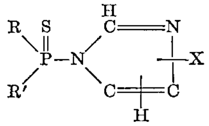

wherein R represents alkyl of from 1 to 10 carbon atoms or cyclohexyl; R′ represents heteroparaffinic amido, selected from morpholino, thiomorpholino, piperidino, 1-pyrrolidinyl, 1,2,3,6 - tetrahydro - 1 - pyridyl or 4-substituted - 1 - piperazinyl in which the substitutent is phenyl, acetyl or loweralkyl of from 1 to 4 carbon atoms, a radical of the formula

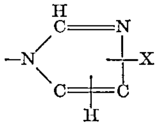

or a radical of the formula

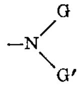

G being methyl or ethyl, and G′ being loweralkyl, phenylloweralkyl, furfuryl, tetrahydrofurfuryl, or (4-pyridylmethyl); and each X independently represents hydrogen, loweralkyl, or phenyl.

2. Compound of claim 1 wherein R represents methyl, R′ represents dimethylamino, and X represents hydrogen, corresponding to N,N,P-trimethyl-P-imidazol - 1 - ylphosphinothioic amide.

3. Compound of claim 1 wherein R represents tert-butyl, R′ represents dimethylamino, and X represents hydrogen, corresponding to N,N-dimethyl - P - tert-butyl-P-imidazol-1-ylphosphinothioic amide.

4. Compound of claim 1 wherein R represents cyclohexyl, R′ represents dimethylamino, and X represents hydrogen, corresponding to N,N-dimethyl - P - cyclohexyl-P-imidazol-1-ylphosphinothioic amide.

References Cited

UNITED STATES PATENTS

| | | | |
|---|---|---|---|
| 3,227,727 | 1/1966 | Greenley et al. | 260—309 |
| 3,336,188 | 8/1967 | Tolkmith et al. | 260—326 E |
| 3,359,276 | 12/1967 | Nielsen et al. | 260—309 |
| 3,399,210 | 8/1968 | Budde et al. | 260—309 |
| 3,433,798 | 3/1969 | Budde et al. | 260—309 |

OTHER REFERENCES

Reist et al.: J. Org. Chem. vol. 25, pp. 666–8 (1960). QD241.J6

Greenley et al. II: J. Org. Chem. vol. 29, pp. 1009–13 (1964). QD241.J6

Nielsen et al. II: J. Chem. Eng. Data vol. 9, pp. 167–70 (1964). TP1.I4

Seidel: Z. Anorg. Allgem. Chem. vol. 335, p. 326 relied on (1965). QD1.Z4

Tolkmith: J. Amer. Chem. Soc. vol. 85, pp. 3246–52 (1963). QD1.A5

NATALIE TROUSOF, Primary Examiner

U.S. Cl. X.R.

260—243 B, 247.1, 268 K, 293.4 B, 294.8 E, 294.8 R; 424—246, 248, 250, 263, 269, 273

PO-1050
(5/69)

UNITED STATES PATENT OFFICE
CERTIFICATE OF CORRECTION

Patent No. 3,637,732 Dated 25 Jan. 1972

Inventor(s) Paul B. Budde and Henry Tolkmith

It is certified that error appears in the above-identified patent and that said Letters Patent are hereby corrected as shown below:

Column 1, 1st line of title, delete "SATURATED".

Column 3, lines 38-42, change formula to:

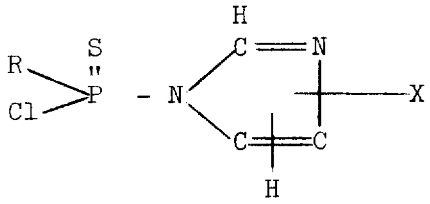

Column 10, line 25, delete "imidazol - 1 -".

Signed and sealed this 1st day of August 1972.

(SEAL)
Attest:

EDWARD M.FLETCHER,JR.
Attesting Officer

ROBERT GOTTSCHALK
Commissioner of Patents